United States Patent [19]
Payne

[11] Patent Number: 5,819,425
[45] Date of Patent: Oct. 13, 1998

[54] LEVEL CLAMP

[76] Inventor: Douglas Payne, P.O. Box 130, Ashland, Mass. 01721

[21] Appl. No.: 726,276

[22] Filed: Oct. 4, 1996

Related U.S. Application Data

[63] Continuation-in-part of Ser. No. 453,647, May 30, 1995, Pat. No. 5,581,900.

[51] Int. Cl.⁶ .............................. G01C 9/28; F16M 13/02
[52] U.S. Cl. .................... 33/370; 33/372; 248/229.13; 248/229.16
[58] Field of Search ..................... 33/370, 371, 372; 248/229.13, 229.16

[56] References Cited

U.S. PATENT DOCUMENTS

| | | |
|---|---|---|
| 1,200,410 | 10/1916 | Chemrinsky . |
| 1,229,916 | 6/1917 | Duncan . |
| 1,940,808 | 12/1933 | Linsert . |
| 2,531,563 | 11/1950 | Feldheim . |
| 2,660,804 | 12/1953 | Mundy . |
| 2,677,192 | 5/1954 | Anderson .................................. 33/372 |
| 2,915,273 | 12/1959 | Gavrun, Sr. . |
| 3,230,632 | 1/1966 | Redding . |
| 4,066,232 | 1/1978 | Hermeyer . |
| 4,745,688 | 5/1988 | Jewers ....................................... 33/372 |
| 4,829,676 | 5/1989 | Waldron ..................................... 33/372 |
| 5,063,679 | 11/1991 | Schwandt . |
| 5,074,509 | 12/1991 | Van Orden . |
| 5,154,000 | 10/1992 | Mahoney et al. .......................... 33/371 |
| 5,581,900 | 12/1996 | Payne ........................................ 33/372 |

*Primary Examiner*—Christopher W. Fulton
*Attorney, Agent, or Firm*—Morse & Altman

[57] ABSTRACT

A clamp for temporarily attaching a level to a construction component including an elongated metal or plastic, inverted U-shaped, two-piece body with an opening in the center of the top wall that extends partway down the side walls through which the level bubble is seen, a pair of pivotally-mounted, spring-loaded, opposed jaws for temporarily gripping the construction component, and grooves, a microcatch patches, or screws for temporarily attaching the level to the body. The two-piece body allows for adjustment to levels of different widths.

19 Claims, 11 Drawing Sheets

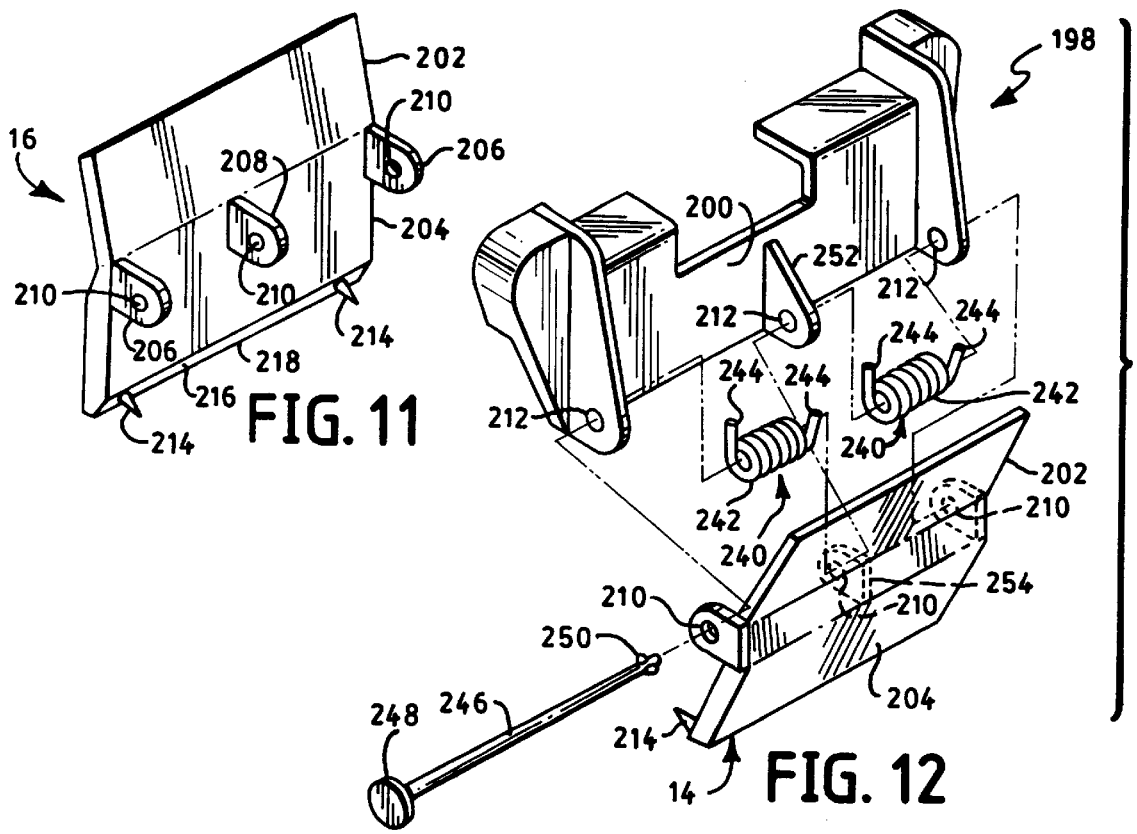
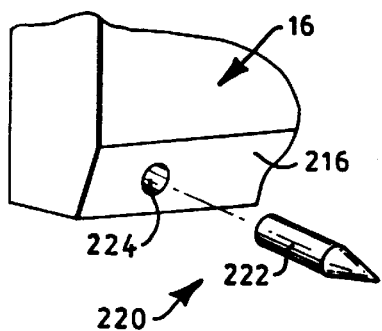
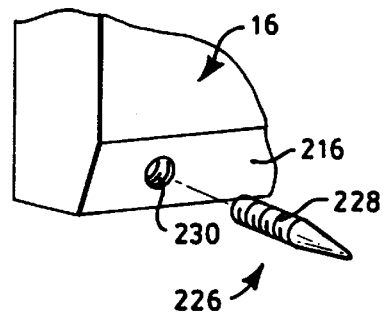
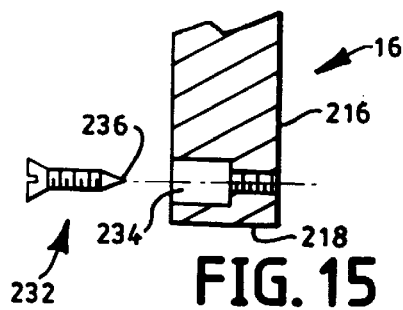

LEVEL CLAMP

RELATED APPLICATIONS

The present application is a continuation-in-part application of application Ser. No. 08/453,647 filed on May 30, 1995 for LEVEL CLAMP in the name of Douglas Payne now U.S. Pat. No. 5,581,900.

BACKGROUND OF THE INVENTION

1. Field of the Invention

The present invention relates generally to tools for building construction and, more particularly, to clamps for holding levels to beams, studs, door frames, and the like.

2. The Prior Art

In any type of building construction, there are construction components that must be oriented in particular ways. For example, 2×4 wall studs must be vertical, window frames must be horizontal or vertical, ceiling joists must be horizontal, deck posts must be vertical, etc. In order to make sure that these components are oriented properly, the level, a basic tool of the construction trade, is used. The most common type of level is the bubble level. In the bubble level, a sealed vial with a slightly convex wall is nearly completely filled with a liquid. The resulting air bubble shows the orientation of the vial. When the vial is in a horizontal position, the bubble is located in the center of the vial. As the vial is moved from the horizontal position, the bubble moves from the center toward one of the ends, indicating that the vial is no longer horizontal.

In order to put the vial to practical use, it is generally mounted in a frame, two forms of which are most common, the box and the I-beam. As their names imply, the box is a three-dimensional rectangular box and the I-beam has the shape of an I in cross-section. The combination of a vial and a box frame is called a box level and the combination of a vial and an I-beam frame is called an I-beam level. The orientation of the vial in the frame depends on the use to which the level is being put. If the level is being used to test the horizontal orientation of a component, the vial is mounted parallel to the reference side of the frame. Thus, when the frame is horizontal or "level", as it is called in the construction trade, the vial is also horizontal, with the bubble centered in the vial. If the level is being used to test the vertical orientation of a component, the vial is mounted perpendicular to the reference side, so that when the reference side is vertical or "plumb", the vial is horizontal, with the bubble centered in the vial. In some special cases, a vial is mounted at an angle other than horizontal or vertical, for example, at 45° from the reference side. Most levels are made with a combination of horizontal and vertical vials.

As stated previously, the level is used to determine whether a construction component is oriented properly prior to permanently securing the component to the larger construct. To use the level, the reference side is placed flush against the component to be measured. If the appropriate bubble is located in the center of its vial, the component is properly oriented and can be secured. If the bubble is not in the center of the vial, the component must be moved until the bubble is centered and then the component can be secured.

The major drawback of the vertical or plumb level is that it takes at least one hand to hold the level flush against a vertical surface of the component while the component is being secured in place. Since it generally takes two hands to position and secure a component, a minimum of two people is needed, one person to hold the level against the component and the other to position and secure the component, which is an inefficient use of construction personnel. In addition, if the person holding the level is not diligent enough or becomes tired, one end of the level may come away from the component and show a false vertical reading, resulting in the component not being plumbed properly.

Although the horizontal level can be set on a horizontal surface of the component without being held, such conduct is not safe. If the component should slip or fall, the level could easily fall off the component, causing damage, especially to the level itself, or personal injury. Thus, the safest course is to hold the level in place while the component is being positioned and secured. As with the vertical level, since it generally takes two hands to position and secure a component, a minimum of two persons is needed, one to hold the level against the component and the other to position and secure the component, which is also an inefficient use of construction personnel.

Thus, there continues to be a need for a device that can properly and efficiently position and hold a level to a construction component, freeing both hands to safely position and secure the component and freeing one person to perform other tasks.

SUMMARY OF THE INVENTION

The level clamp of the present invention is intended to overcome the disadvantages inherent in using levels during construction. Generally, this level clamp comprises a body, a pair of jaws for temporarily gripping a construction component, and a means for temporarily attaching a level to the body. The body is composed of two portions, each having a cross wall and a side wall integrated with the cross wall. There are two embodiments of the body. In the first embodiment, the cross walls are held planar to each by a pair of threaded screws. The screws extend through a pair of holes in a connection block at each end of one body portion. A C-clip secures each screw in its hole. Each screw turns into a threaded hole in an opposed connection block in the other body portion.

In the second embodiment, the cross walls of the body portions overlap. The body portions are connected together by one of several methods. In one method, a threaded stud extends upwardly from the lower portion through an elongated slot in the upper portion and is secured by a nut. In another method, both L-shaped portions have elongated slots and are secured together by bolts and nuts. In a third method, screws used to hold the level to the body extend through slots in the body portions, securing the portions together.

Optionally, there are ribs that extend across each cross wall and down the side wall to give the body portions more rigidity. There is an opening in the center of each cross wall that extends down the side wall through which the level bubble is seen.

Preferably, the level is temporarily attached inside the body by grooves in the inner surface of the side walls, mating microcatch patches, or screws that extend through the cross walls or side walls and into the level.

The body has a pair of metal or plastic, pivotally mounted, opposed jaws, each jaw being mounted near the lower edge of one side wall and being substantially the same length as the body. Preferably, the lower edges of the jaws are toothed or ribbed to securely grip the component to which the level is being clamped. More preferably, the lower edges of the jaws include a plurality of sharp pins to securely grip the component to which the level is being clamped. Optionally, the pins are replaceable. Preferably, the upper portions of the jaws are adapted to be manually gripped. As the upper portions of the jaws are forced together, such as by manually squeezing the edges together, the lower edges separate. As the force on the upper portions is released, a plurality of springs forces the lower edges of the jaws toward each other.

BRIEF DESCRIPTION OF THE DRAWINGS

For a fuller understanding of the nature and object of the present invention, reference is made to the accompanying drawings, wherein:

FIG. 11 is a perspective view of a jaw;

FIG. 12 is an exploded view of the assembly of one jaw to the body;

FIG. 13 is a perspective, exploded view of an alternate pin configuration of the jaw;

FIG. 14 is a perspective, exploded view of another alternate pin configuration of the jaw;

FIG. 15 is a partial cross-sectional, exploded view of another alternate pin configuration of the jaw.

DETAILED DESCRIPTION

The preferred embodiment of the level clamp 10 of the present invention includes a body and a pair of jaws 14, 16. The body 12 has two preferred embodiments 20, 102, shown in FIGS. 2–3 and FIGS. 4–6.

Figure 1:
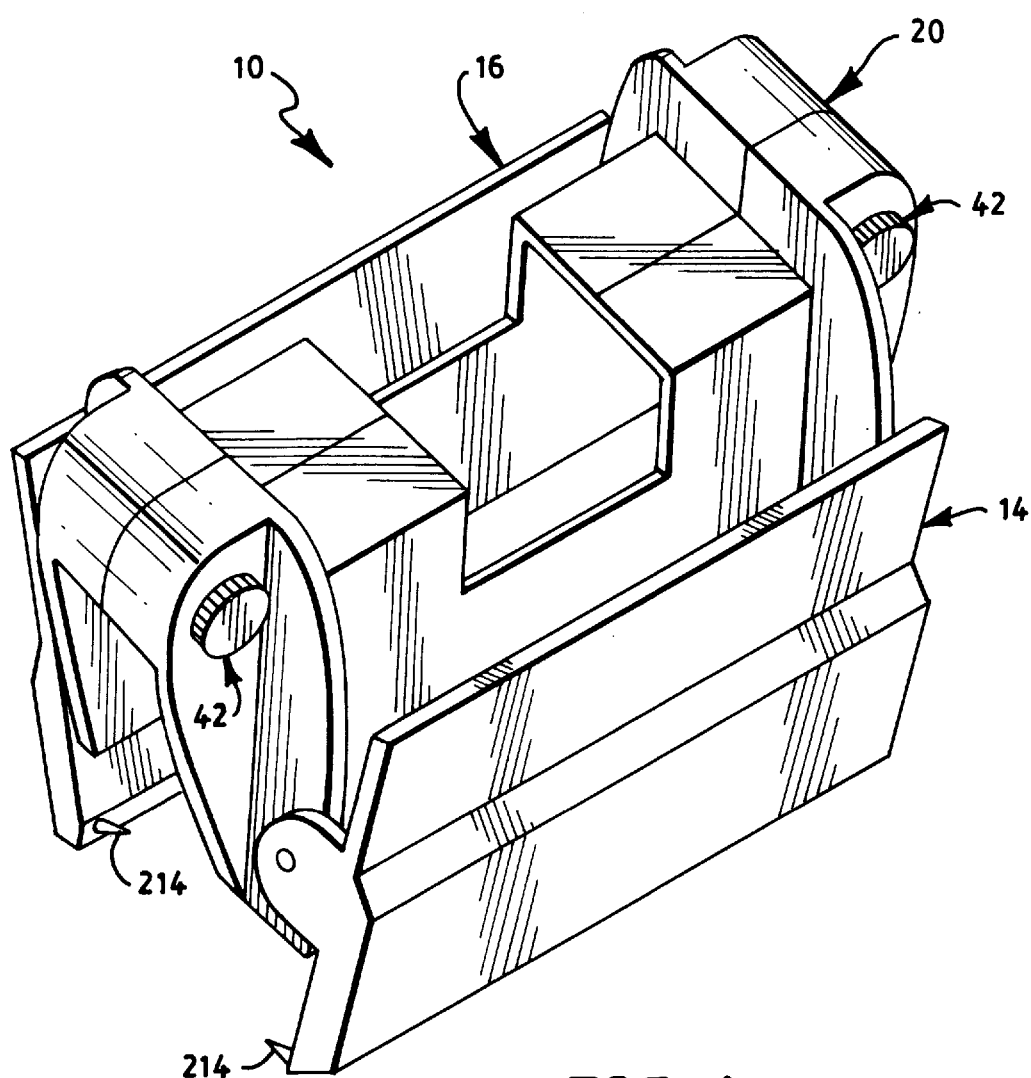
FIG. 1 is a perspective view of one embodiment of the present invention.
Figure 2:
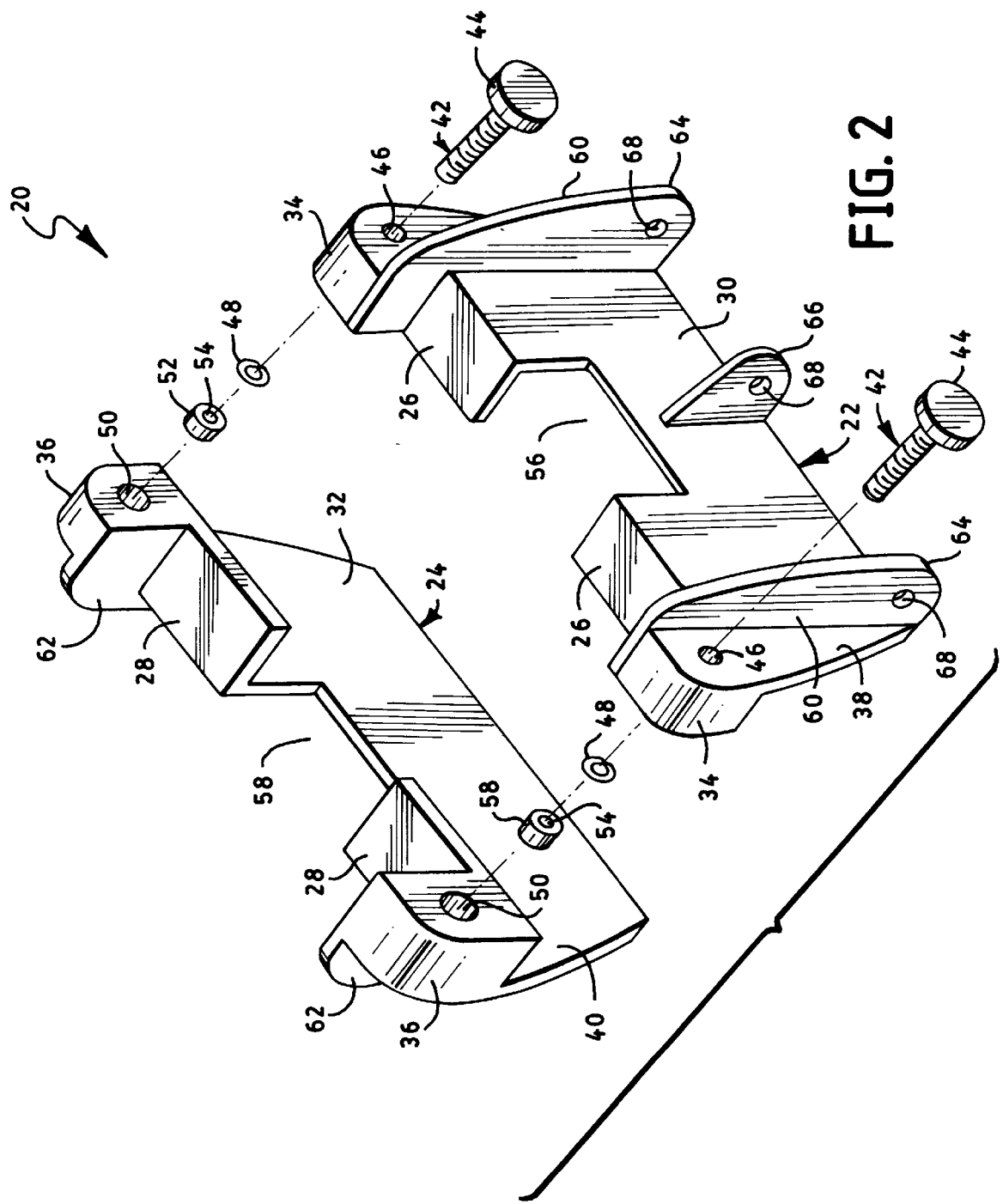
FIG. 2 is a perspective view of one embodiment of the body.
Figure 3:
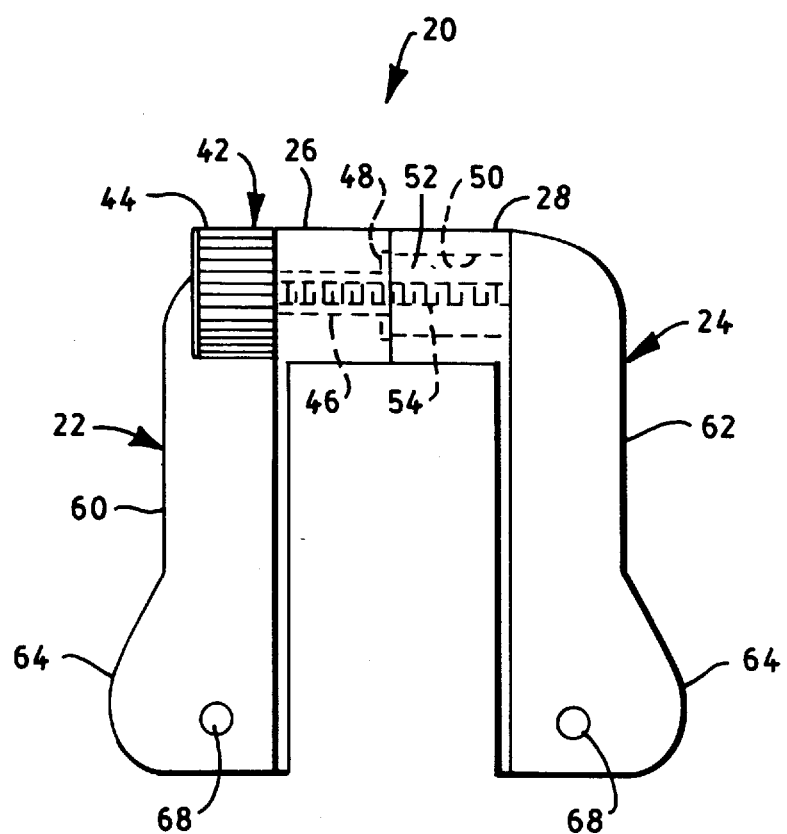
FIG. 3 is an end view of the body of FIG. 2.

The Body of FIGS. 1–3

In this embodiment, the body 20 is composed of two approximately mirror-image body portions 22, 24. Each body portion 22, 24 is preferably composed of either an extrusion of aluminum or rigid plastic or a molded aluminum or rigid plastic. The preferred plastic material is acrylonitrile butadiene styrene resin (ABS plastic) or Lexan®. Each body portion 22, 24 includes a cross wall 26, 28 and an integral side wall 30, 32. The side wall 30, 32 extends downwardly substantially perpendicularly from the edge of the cross wall 26, 28, forming an inverted L shape when viewed in cross section.

Extending from each end of the cross walls 26, 28 is a connection block 34, 36. A brace 38, 40 extending from the side wall 30, 32 supports the connection block 34, 36. A threaded screw 42 with a finger knob 44 extends through a hole 46 in the connection blocks 34 of one of the body portions 22. The screw 42 is captured by a clip 48 so that the screw 42 can rotate but not reciprocate within the hole 46. If the body portions 22, 24 are composed of plastic, the blocks 36 of the other body portion 24 have a hole 50 into which is pressed a metal threaded insert 52. If the body portions 22, 24 are composed of metal, there is no insert and the connection block hole is threaded. The two body portions 22, 24 are connected together by turning the screws 42 into the threaded holes 54 until the desired distance between the side walls 30, 32 is reached.

Preferably, the assembled body 20 is between 4 inches and 5 inches long and has a height of between 1¾ inches and 2 inches. Preferably, the distance between the side walls 30, 32 is adjustable between ¾ inch and 3 inches.

An opening 56, 58 runs the entire width of both cross walls 26, 28 and extends partway down the side walls 30, 32. The opening 56, 58 permits the user to view the level bubble from various orientations.

Optionally, there are a pair of ribs 60, 62, one near each end of each body portion 22, 24, that extend across the cross wall 26, 28 and down the side wall 30, 32. The ribs 60, 62 impart rigidity to the body portions 22, 24 so that they do not bend outwardly a significant amount when the clamp 10 is in use.

Extending substantially perpendicularly outward from the side wall 30, 32 is a pair of flanges 64. Optionally, the flanges 64 are extensions of the ribs 60, 62. Optionally, there is a third flange 66 extending from the side wall 30, 32 approximately equidistant from the end flanges 64. Through each flange 64, 66 is a substantially circular pivot hole 68, all of which are axially aligned with each other.

Figure 4:
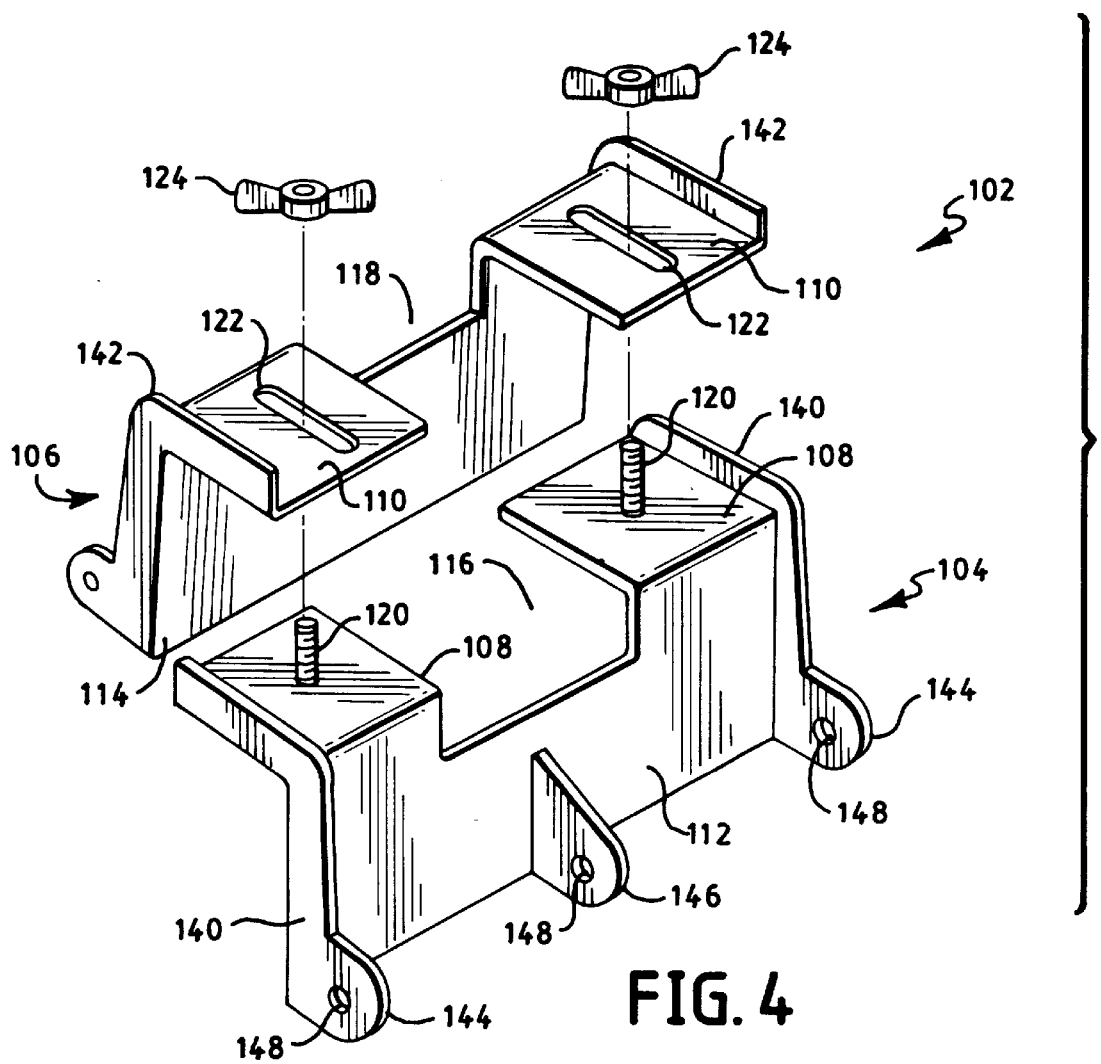
FIG. 4 is a perspective view of one method of connecting the two body components of the body of FIG. 2.
Figure 5:
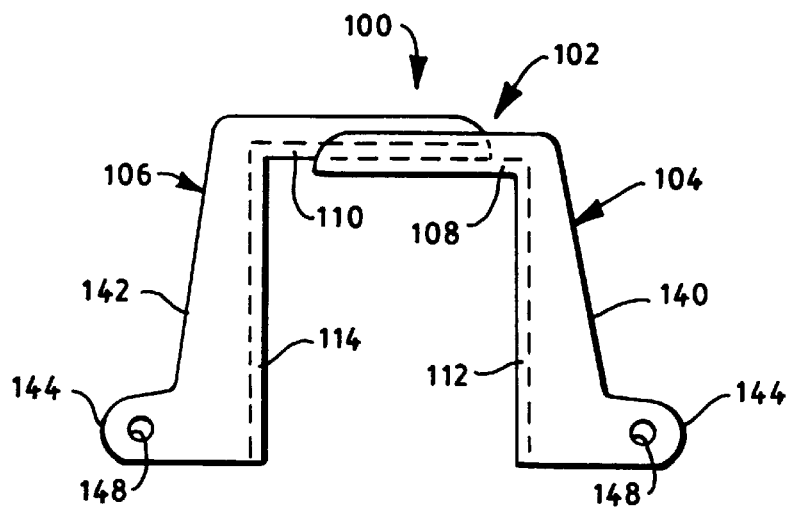
FIG. 5 is a perspective view of the second embodiment of the body.
Figure 6:
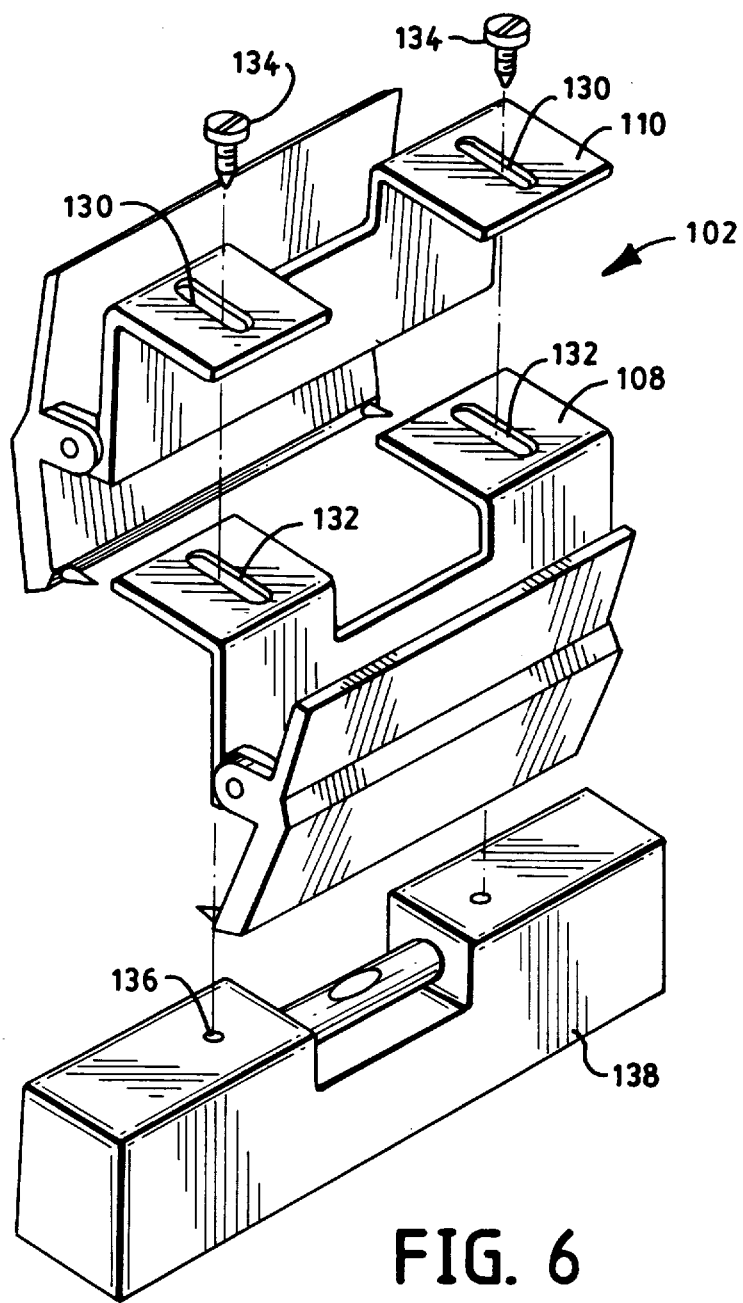
FIG. 6 is an end view of the body of FIG. 5.

The Body of FIGS. 4–6

The body 102 is composed of two approximately mirror-image body portions 104, 106. Each body portion 104, 106 is preferably composed of either a formed sheet metal, such as steel, an extrusion of aluminum or rigid plastic, or a molded aluminum or rigid plastic. The preferred plastic material is acrylonitrile butadiene styrene resin (ABS plastic) or Lexan®. Each body portion 104, 106 includes a cross wall 108, 110 and an integral side wall 112, 114. The side wall 112, 114 extends downwardly substantially perpendicularly from the edge of the cross wall 108, 110, forming an inverted L shape when viewed in cross section.

There are three preferred ways that the body portions 104, 106 are connected together. In one configuration, shown in FIG. 4, a pair of threaded studs 120 extend upwardly from the upper surface of one cross wall 108. These studs 120 fit through a pair of elongated holes 122 extending across the other cross wall 110, one on each side of the opening 118. A threaded nut 124, such as a wing nut, is tightened onto the studs 120 after the desired distance between the side walls 112, 114 is set.

In the second configuration, both cross walls 106, 108 have a pair of elongated holes, rather than one of the cross walls 108 having the studs 120 of the first configuration. A pair of screws extends upwardly through the holes, and a threaded nut, such as a wing nut, is tightened onto the screws after the desired distance between the side walls 112, 114 is set.

A third configuration is used in conjunction with attaching a level 138 to the body 102. As shown in FIG. 6, there is a pair of elongated holes 130 extending across one cross wall 110 and a matching pair of elongated holes 132 extending across the other cross wall 108. A screw 134 is inserted into each pair of holes 130, 132 and turned into a threaded hole 136 in the upper surface of the level 138. The distance between the side walls 112, 114 is set at the same time that the level 138 is attached to the body 102.

Preferably, when assembled, the body 102 is between 4 inches and 5 inches long and has an overall height of between 1¾ inches and 2 inches. Because of the overlap of the cross walls 108, 110, the height of the upper portion 106 is greater than the lower portion 104. Preferably, the distance between the side walls 112, 114 is adjustable between ¾ inch and 3 inches.

An opening 116, 118 runs the entire width of both cross walls 108, 110 and extends partway down the side walls 112, 114. The opening 116, 118 permits the user to view the level bubble from various orientations.

Optionally, there are a pair of ribs 140, 142, one near each end of each body portion 104, 106, that extend across the cross wall 108, 110 and down the side wall 112, 114. The ribs 140, 142 impart rigidity to the body portions 104, 106 so that they do not bend outwardly a significant amount when the clamp is in use. When ribs 140, 142 are used, the upper body portion 106 is shorter than the lower body portion 104 so that it will slide between the lower body portion ribs 140.

Extending substantially perpendicularly outward from the side wall 112, 114 is a pair of flanges 144. Optionally, the flanges 144 are extensions of the ribs 140, 142. Optionally, there is a third flange 146 extending from the side wall 112, 114 approximately equidistant from the end flanges 144. Through each flange 144, 146 is a substantially circular pivot hole 148, all of which are axially aligned with each other.

Methods for Attaching a Level to the Clamp of FIGS. 7–10

Figure 7:
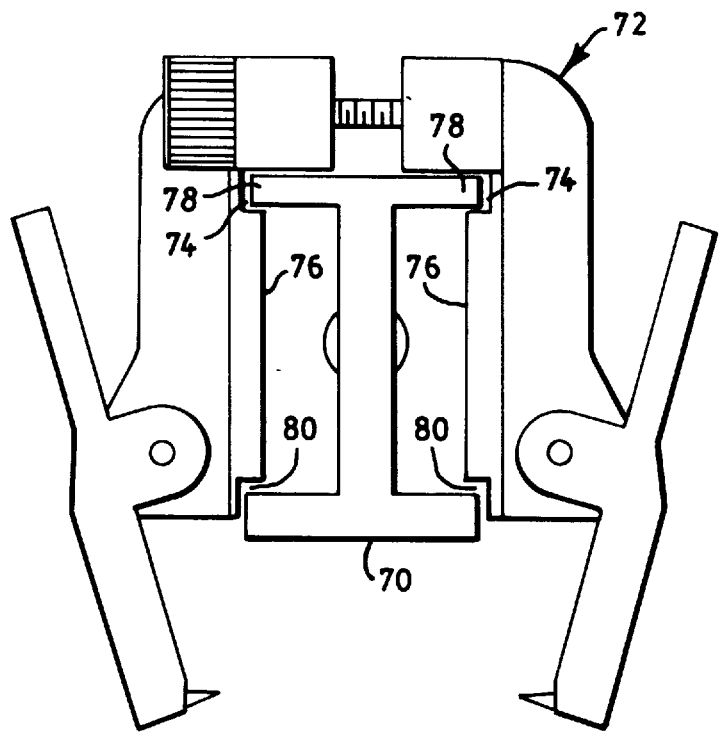
FIG. 7 is an end view of the groove method for connecting the level to the clamp.

There are several preferred methods for attaching the level to a level clamp. When an I-beam level is used, one preferred method, as shown in FIG. 7, is to include longitudinal grooves 74 at the upper end of the inner surfaces 76 of the side walls. The I-beam level 70 slides into the body 72 at the end, where the edges 78 of the upper surface of the I-beam level 70 fit into the grooves 74. Optionally, there are longitudinal grooves 80 at the lower end of the inner surface 76. These lower grooves 80 allow the clamp to be used with an I-beam level that has a height that is only slightly greater than the height of the inner surface 76.

Figure 8:
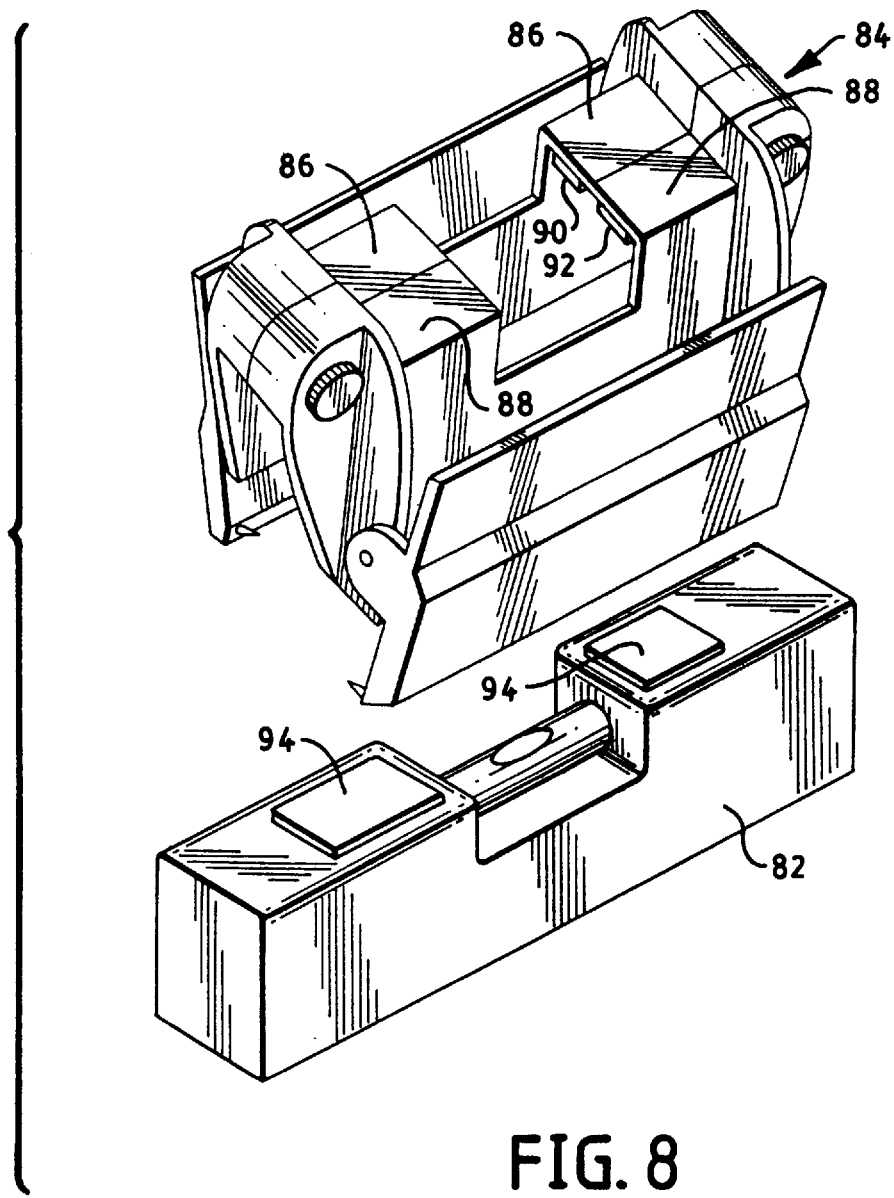
FIG. 8 is a perspective view of the microcatch method for connecting the level to the clamp.

When either a I-beam or box level is used, as shown in FIG. 8, two pairs of microcatch patches 90, 92 attached to the under surface of both parts of the cross walls 86, 88 is used. These patches 90, 92 mate with a pair of matching microcatch patches 94 attached to the upper surface of the level 82 and are used to removably attach the level 82 to the body 84.

Figure 9:
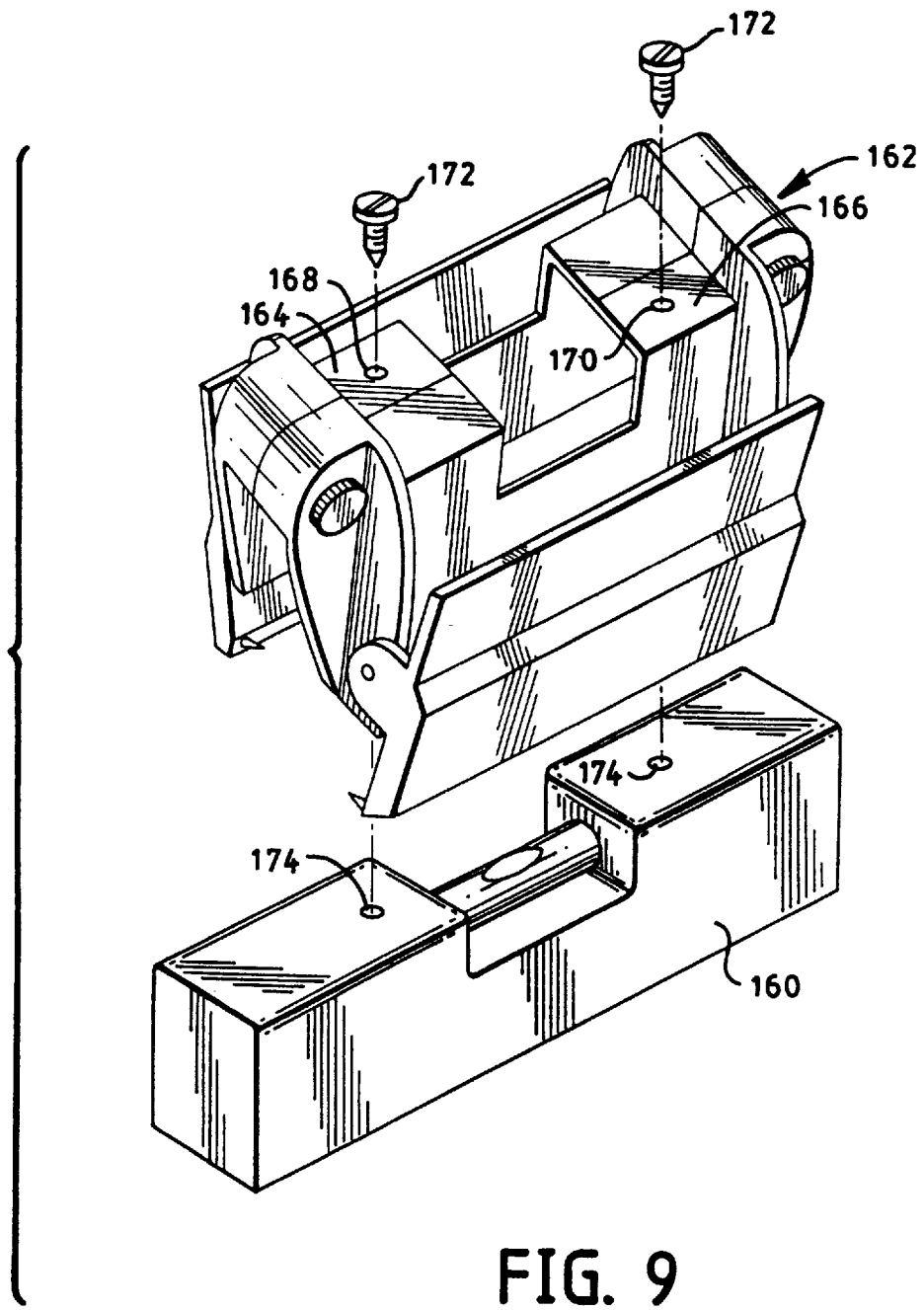
FIG. 9 is a perspective view of the top screw method for connecting the level to the clamp.

In another configuration, shown in FIG. 9, either an I-beam or box level 160 is held to the body 162 by a plurality of screws 172 that extend through a plurality of holes 168, 170 located in the cross walls 164, 166 and that are turned into holes 174 in the top surface of the level 160. The holes 174 in the level can be threaded or unthreaded. If they are unthreaded, the screws 172 must be self-tapping so that they hold the level 160 to the body 162.

Figure 10:
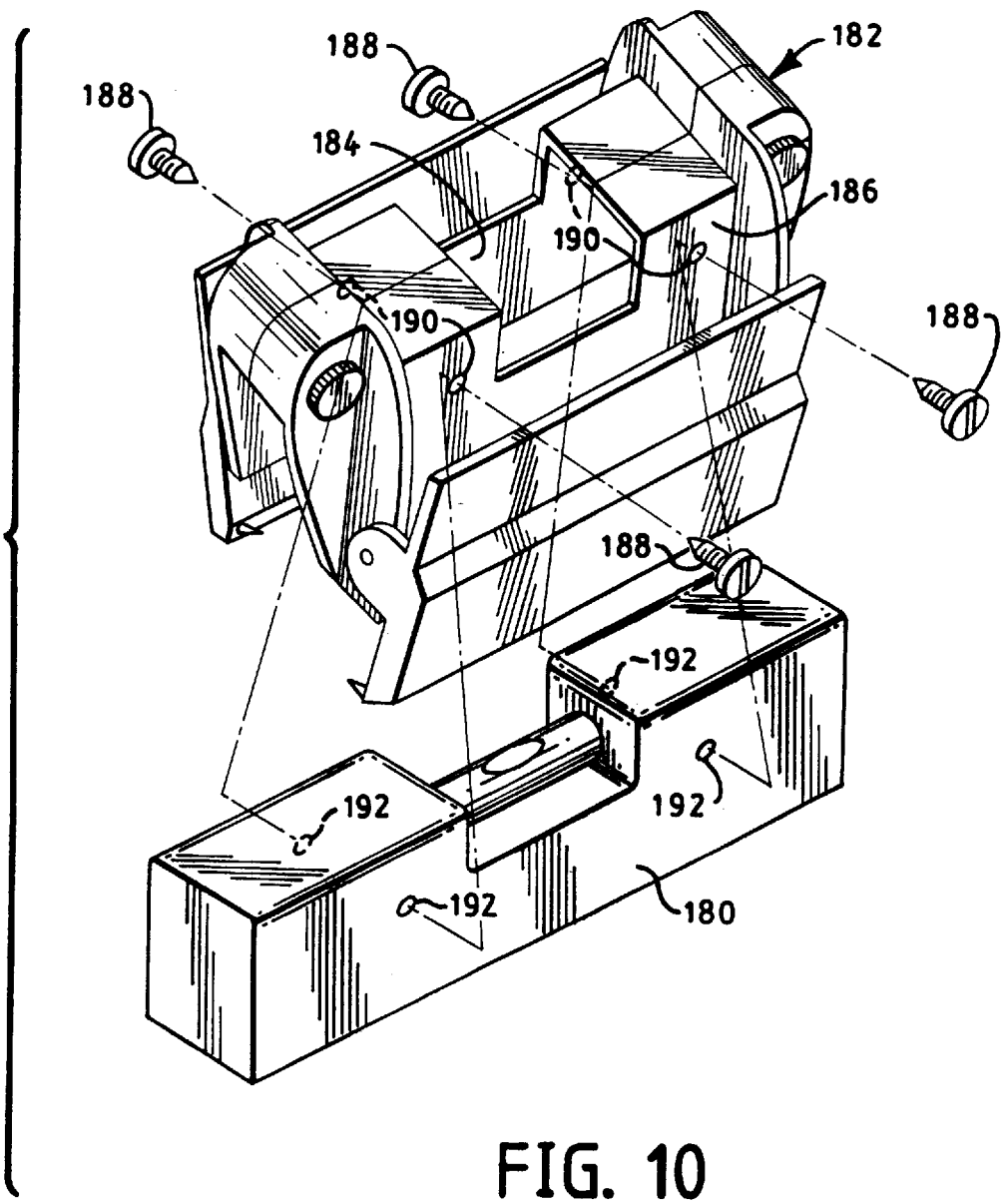
FIG. 10 is a perspective view of the side screw method for connecting the level to the clamp.

In a fourth configuration, shown in FIG. 10, a box level 180 is held to the body 182 by a plurality of screws 188 that extend through a plurality of holes 190 located in the side walls 184, 186 and that are turned into holes 192 in the sides of the level 180. The holes 192 in the level can be threaded or unthreaded. If they are unthreaded, the screws 188 must be self-tapping so that they hold the level 180 to the body 182. With this configuration, ribs are not needed to keep the side walls 184, 186 from flexing outwardly, since the screws 188 perform the same function in addition to holding the level 180 to the body 182.

Any combination of the above-described configurations may be included in any particular embodiment of the clamp. For example, one embodiment of the clamp may include grooves as in FIG. 7, microcatch patches as in FIG. 8, holes in the cross walls as in FIG. 9, and holes in the side walls as in FIG. 10. The various combinations of attachment configurations allow the user to select the method for attaching the level to the clamp that is appropriate for the situation.

The Jaws of FIGS. 11–15

One of the pair of jaws 16 is shown in isolation in FIG. 11, and the other jaw 14, shown in FIG. 12, is the mirror image of the first jaw 16. Preferably, the jaws 14, 16 are approximately planar, and include an upper portion 202 and a lower portion 204. The jaws 14, 16 are approximately the same length as the body portions 198 and approximately 1½ times the height of the side walls 200.

Extending substantially perpendicularly from the jaw 14, 16 between the upper portion 202 and lower portion 204 are a pair of mounting ears 206. Optionally, there is a third mounting ear 208 approximately equidistant from the outer two ears 206. Each ear 206 has a substantially circular pivot hole 210, where both holes 210 are axially aligned and have about the same diameter as the body pivot holes 212.

The upper portions 202 of both jaws are adapted to be easily gripped by one hand when the jaws 14, 16 are connected to the body portions 198, as described below. A plurality of pins 214 extend approximately perpendicularly from the inner surface 216 adjacent to the lower edge 218 of the lower portion 204. Preferably there are two pins 214, one near each end of the jaw 14, 16. The pins 214 allow the jaws 14, 16 to securely grip the construction element to which the level is being clamped. In one configuration, the pins 214 are integrally formed with the jaw 14, 16. In another configuration, shown in FIG. 13, the pins 220 are manufactured separately such that the pin barrel 222 is slightly larger than the hole 224 into which the barrel 222 is inserted. The barrel 222 is forced into the hole 224 and is held in place by the size differential. In a third configuration, shown in FIG. 14, the pins 226 are manufactured separately such that the pin barrel 228 is threaded. The jaw hole 230 is also threaded and the threaded barrel 228 is screwed into the threaded jaw hole 230. In a fourth configuration, shown in FIG. 15 in partial cross-section, the pins are standard screws 232. Each screw 232 is screwed into a hole 234 through the jaw 16 near the lower edge 218 until the point 236 extends beyond the jaw inner surface 216. This last configuration enables the user to replace the pins 232 with commonly available screws when they wear out, rather than having to purchase special pins from the manufacturer of the clamp.

As in FIG. 12, each jaw 16 is pivotally mounted to the body portion 198 via the ear holes 210 and flange holes 212 such that the pins 214 point toward each other and the holes 210, 212 are axially aligned. At least one spring 240 is associated with each jaw 16. If there are two flange-ear pairs, there is one spring 240. If there are three flange-ear pairs, there are two springs 240. Each spring 240 has a coil 242 from which the ends of the coil 244 tangentially extend, forming a V-shape in cross-section, with the coil 242 at the apex. A shaft 246 extends through the ear holes 210, the flange holes 212, and the spring coils 242. If there are two springs 240, one is located on each side of the center flange 252 and center ear 254. A head 248 on one end of the shaft 246 and a flattened portion at the other end 250 of the shaft 246 precludes the shaft 246 from being removed from the holes 210, 212 and spring coils 242. Alternatively, the ends of the shaft 246 may both be flattened or expanded. The springs 240 are oriented such that the upper portion 202 of the jaw 14 is biased away from the body portion 198, forcing the pins 214 toward the pins of the other jaw 16.

OPERATION

Figure 16:
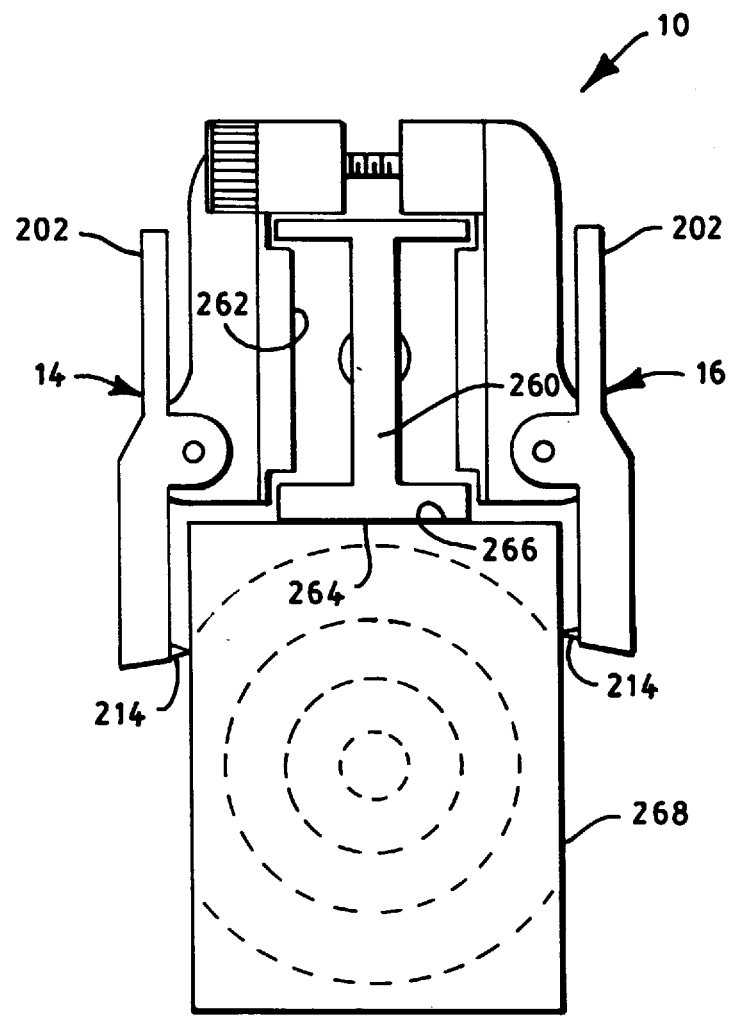
FIG. 16 is an end view of the operation of the clamp.

FIG. 16 shows that operation of clamp the present invention 10 with an I-beam level 260. The height of the level 260 is necessarily greater than the height of the inner surface 262 so that the reference surface 264 of the level 260 will make contact with the surface 266 of the construction element 268.

In operation, the level 260 is first attached to the clamp 10. If the clamp 10 has grooves for an I-beam level, as in FIG. 16, the level 260 is slid into the clamp 10. If microcatch patches are used, the patches mate and adhere to each other. If screws are used, the screws are turned into the holes in the level.

The jaws 14, 16 are opened by gripping with the hand around the upper portion 202 of both jaws 14, 16 and applying pressure by closing the hand. When the pins 214 are far enough apart to fit around the construction element 268 to which the level 260 is being attached, the jaws 14, 16 are placed on either side of the construction element 268, making sure that the level reference side 264 is flush to the construction element surface 266. The manual pressure is released and the pins 214 hold the level 260 against the construction element surface 266. If the pins 214 are angled slightly upward toward the level 260, as they typically will be, the pins 214 will pull the level 260 more securely against the construction element surface 266, making the level reading more accurate.

To remove the level 260, the procedure is reversed.

What is claimed is:

1. A clamp for temporarily holding a level against an elongated construction element having a straight edge to be predeterminedly oriented, said level including at least a straight edge and at least a bubble geometrically related thereto, said clamp comprising:
   (a) a body including two portions, each portion having a cross wall and a side wall extending approximately perpendicularly from one edge of said cross wall, said portions being fastened together such that said cross walls are approximately parallel, a cross section of said body forms a U shape, and the distance between said side walls is adjustable, each of said cross walls having an inner surface and an outer surface and each of said sides walls having an inner surface and an outer surface;
   (b) a connector for joining said body with said level during operative engagement of said level with said construction element;
   (c) a pair of opposed jaws pivotally attached to said opposed side walls, said jaws having an upper portion and a lower portion, said pivotal attachment including at least one spring for biasing the lower edge of said jaw lower portions toward each other;
   (d) said jaws clamping said construction element therebetween when said level and said construction element are in said operative engagement; and
   (e) said body having an opening for display of said bubble when said body and said level are joined by said connector.

2. The clamp of claim 1 wherein said cross walls overlap when said body portions are fastened together, one of said portions being an upper portion and the other of said portions being a lower portion, said upper portion cross wall inner surface being adjacent to said lower portion cross wall outer surface.

3. The clamp of claim 2 wherein said portions are fastened together by at least one threaded stud extending upwardly from said lower portion cross wall outer surface, through a hole in said upper portion cross wall, and secured by a threaded nut turned onto said threaded stud.

4. The clamp of claim 2 wherein said portions are fastened together by at least one threaded bolt extending through a hole in said lower portion cross wall and a hole in said upper portion cross wall and secured by a threaded nut turned onto said threaded bolt.

5. The clamp of claim 2 wherein said portions are fastened together by at least one screw extending through a hole in said upper portion cross wall and a hole in said lower portion cross wall and that is turned into a threaded hole in said level.

6. The clamp of claim 1 wherein said cross walls are approximately planar when said body portions are fastened together.

7. The clamp of claim 6 wherein said cross walls are fastened together by a plurality of screws having knobs, said screws being approximately parallel to said cross walls and extending through holes in one of said portions and turned into threaded holes in the other of said portions.

8. The clamp of claim 1 wherein each of said jaw lower portions has a lower edge with a plurality of pins projecting inwardly therefrom.

9. The clamp of claim 8 wherein said pins are replaceable.

10. The clamp of claim 1 wherein each of said body portions has at least a rib extending across said cross wall outer surface and down said side wall outer surface.

11. The clamp of claim 1 wherein said connector for joining said body with said level includes at least one groove in each of said side wall inner surfaces.

12. The clamp of claim 1 wherein said connector for joining said body with said level includes at least one microcatch patch attached to at least one of said cross wall inner surfaces and a mating microcatch patch attached to said level.

13. The clamp of claim 1 wherein said connector for joining said body with said level includes at least a through hole in said body, a like number of screws, and at least a like number of level holes in said level, whereby said screw is inserted into said through hole and screwed into said level hole.

14. A clamp for temporarily holding a level against an elongated construction element having a straight edge to be predeterminedly oriented, said level including at least a straight edge and at least a bubble geometrically related thereto, said clamp comprising:
   (a) a body including two portions, each portion having a cross wall and a side wall extending approximately perpendicularly from one edge of said cross wall, said portions being fastened together such that said cross walls are approximately planar, a cross section of said body forms a U shape, and the distance between said side walls is adjustable, each of said cross walls having an inner surface and an outer surface and each of said sides walls having an inner surface and an outer surface;
   (b) a connector for joining said body with said level during operative engagement of said level with said construction element;
   (c) a pair of opposed jaws pivotally attached to said opposed side walls, each of said jaws having an upper portion adapted to be manually gripped and a lower portion with a lower edge having a plurality of pins projecting inwardly therefrom, said pivotal attachment including at least one spring for biasing said lower edges toward each other;
   (d) said jaws clamping said construction element therebetween when said level and said construction element are in said operative engagement; and
   (e) said body having an opening for display of said bubble when said body and said level are joined by said connector.

15. The clamp of claim 14 wherein said cross walls are fastened together by a plurality of screws having knobs, said screws being approximately parallel to said cross walls and extending through holes in one of said portions and turned into threaded holes in the other of said portions.

16. The clamp of claim 14 wherein said pins are replaceable.

17. The clamp of claim 14 wherein said connector for joining said body with said level includes at least one groove in each of said side wall inner surfaces.

18. The clamp of claim 14 wherein said connector for joining said body with said level includes at least one microcatch patch attached to at least one of said cross wall inner surfaces and a mating microcatch patch attached to said level.

19. The clamp of claim 14 wherein said connector for joining said body with said level includes at least a through hole in said body, a like number of screws, and at least a like number of level holes in said level, whereby said screw is inserted into said through hole and screwed into said level hole.

* * * * *